J. C. SMITH.
ABRASIVE IMPLEMENT.
APPLICATION FILED JULY 2, 1913.

1,139,817.

Patented May 18, 1915.

WITNESSES:
G. C. Fliedner
J. M. Ball

INVENTOR.
James C. Smith
BY Francis M. Wright
ATTORNEY

UNITED STATES PATENT OFFICE.

JAMES C. SMITH, OF SAN FRANCISCO, CALIFORNIA.

ABRASIVE IMPLEMENT.

1,139,817.  Specification of Letters Patent.  Patented May 18, 1915.

Application filed July 2, 1913. Serial No. 776,953.

*To all whom it may concern:*

Be it known that I, JAMES C. SMITH, a citizen of the United States, residing at San Francisco, in the county of San Francisco and State of California, have invented new and useful Improvements in Abrasive Implements, of which the following is a specification.

The possibility of successful commercial introduction of many articles which consists wholly or in part of bars, sticks, or plates, and especially those formed of wood, often depends upon the magnitude of the original cost of production. In manufacturing such articles the bars, stocks, or plates have to be first formed of the required size, and then to have their surfaces smoothed or finished. When several separate operations and the intermediate handling of the articles are required in the manufacturing, one for cutting out the bar, plate or stick, and the others for smoothing or finishing its surfaces, the cost of production is often practically prohibitive.

It is the object of the present invention to provide means whereby the surfaces of the bars, sticks or plates can be smoothed or finished at the same time that the bar, stick or plate is cut out, thereby avoiding a double operation and the intermediate handling.

Figure 1:
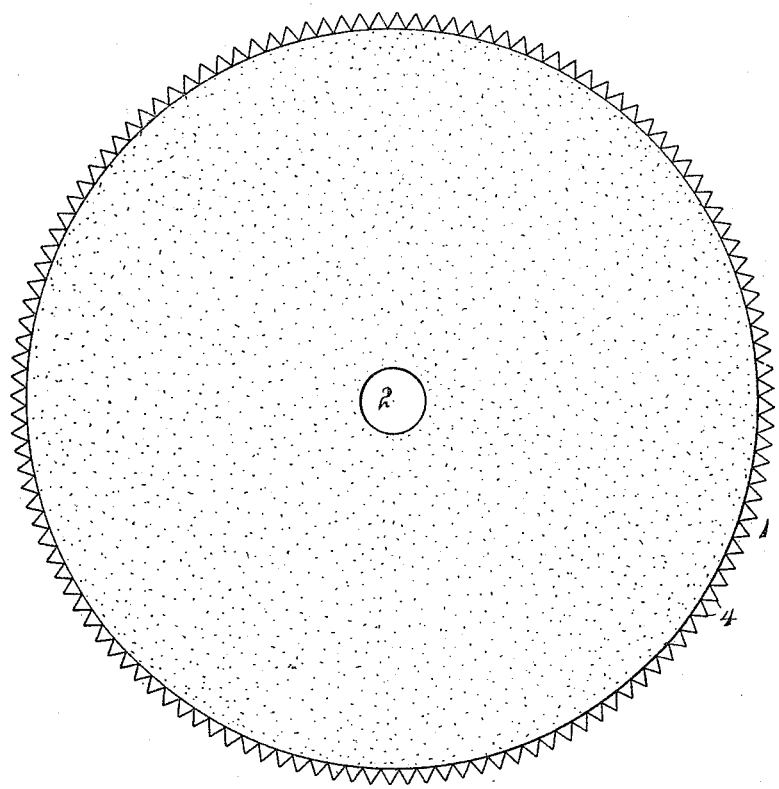
Figure 2:
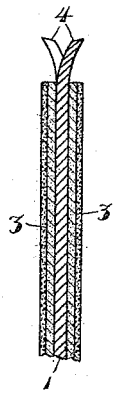

In the accompanying drawing, Figure 1 is a side view of my improved device; Fig. 2 is a cross section of a portion thereof on a greatly enlarged scale.

Referring to the drawing, 1 indicates a circular saw of ordinary construction having a central hole 2 for attachment to a rotatable shaft. On each side of the saw there is secured a disk 3 of abrasive material, such as sand-paper, emery cloth, or the like. Said disk is secured on the saw concentric therewith, and has a circular hole in the center registering with the hole 2 in the saw. The diameter of each disk is such that its edge just extends to the base of the teeth 4 of the saw. The teeth of the saw are set on each side to a distance to lie exactly in the plane of the outer surface of the abrasive disk on that side. When a block of wood or other material is cut by such a saw, the abrasive disks, entering the cut made by the teeth of the saw, and revolving rapidly in said cut, abrade the sides of said cut, so as to leave them with smooth and finished surfaces. It is thereby rendered no longer necessary to subject said surfaces to a separate operation of smoothing and finishing, thereby greatly reducing the cost of the bar, plate or stick, formed by the cuts.

It is necessary that the set of the teeth should be such that their outermost portions should lie in the same plane as the outer surface of the abrasive disks. For, if the set of the teeth is not sufficiently great, then the abrasive disks have to enter a cut in the wood or other material narrower than the interval between the outer surfaces of said disks, and consequently the saw is soon brought to rest. If the teeth are set too far out, then the abrasive disks do not come into contact with, or come into contact only with portions of, the surfaces to be abraded thereby. But I have found that, if the abrasive disks be of such thicknesses relatively to the set of the teeth of the saw that the outermost portions of the teeth are in the same planes as the outer surfaces of the disks, then the surfaces of the cut made by the saw are smooth and finished by the same operation as that of cutting.

As an inferior form of the invention, the saw teeth may be omitted, and the rotating disks may be used for abrasive purposes only.

I claim:—

The combination with a saw blade having oppositely set peripheral teeth, of abrasive disks secured to the opposite sides of the saw blade, with their outer peripheries flush with the inner ends of the teeth, and the outer sides thereof disposed in the same plane as the outer points of said teeth.

In testimony whereof I have hereunto set my hand in the presence of two subscribing witnesses.

JAMES C. SMITH.

Witnesses:
 FRANCIS M. WRIGHT,
 D. B. RICHARDS.